US006637086B2

(12) United States Patent
Berntsson et al.

(10) Patent No.: US 6,637,086 B2
(45) Date of Patent: Oct. 28, 2003

(54) METHOD AND ARRANGEMENT FOR AUTOMATIC BOW ADJUSTMENT

(75) Inventors: Peter Ingemar Berntsson, Varekil (SE); Jan Olof Larsson, Odsmal (SE); Jonas Leo Larsson, Gothenburg (SE)

(73) Assignee: Hunter Douglas Industries B.V., Rotterdam (NL)

( * ) Notice: Subject to any disclaimer, the term of this patent is extended or adjusted under 35 U.S.C. 154(b) by 0 days.

(21) Appl. No.: 10/109,454

(22) Filed: Mar. 27, 2002

(65) Prior Publication Data

US 2002/0104348 A1 Aug. 8, 2002

Related U.S. Application Data

(62) Division of application No. 09/541,258, filed on Apr. 3, 2000, now Pat. No. 6,393,884.

(30) Foreign Application Priority Data

Apr. 2, 1999 (EP) .......................................... 99201013

(51) Int. Cl.[7] .............................................. B23P 19/04

(52) U.S. Cl. ......................................... 29/24.5; 29/714

(58) Field of Search ......................... 29/24.5, 428, 433, 29/445, 408, 714, 766, 771

(56) References Cited

U.S. PATENT DOCUMENTS 3,555,864 A * 1/1971 Wegner ...................... 72/12.5
3,587,265 A 6/1971 Siviloti ......................... 72/8.6
3,751,774 A 8/1973 Hannaway .................. 26/51.4
3,766,815 A * 10/1973 Edixhoven ................... 83/160
3,799,038 A 3/1974 Bossons et al. ................ 493/8
3,919,900 A 11/1975 Allen et al. .................... 76/27
4,073,044 A * 2/1978 Edixhoven .................. 29/24.5
4,145,905 A 3/1979 Mattie ......................... 72/177
4,173,879 A 11/1979 Vecchiarelli ................. 72/179
4,261,498 A 4/1981 Short ............................ 226/3
4,414,476 A 11/1983 Maddox et al. ........ 250/559.37
4,457,149 A 7/1984 Weinzinger et al. ........... 72/10
4,499,938 A 2/1985 Toti ........................... 160/236
4,656,360 A 4/1987 Maddox et al. ........ 250/559.37
4,711,005 A 12/1987 Chang ........................ 29/24.5
4,789,515 A 12/1988 Chi Yu ....................... 264/285
4,989,164 A 1/1991 Desrousseaux ................ 702/4
5,099,556 A 3/1992 Lim ........................... 29/24.5
5,127,138 A 7/1992 Lim ........................... 29/24.5
5,333,365 A 8/1994 Marocco et al. ............. 29/24.5
5,349,730 A 9/1994 Anderson et al. ............ 29/24.5
5,535,610 A 7/1996 Noe et al. ...................... 72/8.6
5,567,208 A 10/1996 Larsson et al. .............. 29/24.5
5,687,595 A 11/1997 Noe et al. ...................... 72/8.3
5,755,131 A 5/1998 Voth ............................ 72/240
5,829,286 A 11/1998 Noe et al. ...................... 72/8.6
6,029,553 A 2/2000 Berntsson et al. ........... 83/76.1
6,164,104 A 12/2000 Noe et al. .................... 72/12.3
6,223,577 B1 5/2001 Ujc et al. ...................... 72/181
6,286,349 B1 9/2001 Muller et al. ................ 72/11.7
6,393,884 B1 * 5/2002 Berntsson et al. ............ 72/9.1
6,427,507 B1 * 8/2002 Hong et al. ................... 72/9.1

FOREIGN PATENT DOCUMENTS

EP 0674092 9/1995

* cited by examiner

*Primary Examiner*—Gregory Vidovich
*Assistant Examiner*—Essama Omgba
(74) *Attorney, Agent, or Firm*—Dorsey & Whitney LLP

(57) ABSTRACT

The present invention relates to a method for automatic bow adjustment for a venetian blind assembly machine, said bow adjustment station comprising rollers (48; 104, 106) for guiding, bending and levelling a strip material (43; 112), and further comprising a forming section (36; 102) where mating concave and convex upper and lower form rollers (50; 108, 110) are arranged for creating a transverse curvature in the strip material, further comprises the steps of: providing levelling through means for offsetting (34; 100, 102) in order to straighten the bow of the strip material (43; 112) within a predetermined deviation on a predetermined length of strip material; measuring the deviation through optical means (146) providing a deviation signal; and adjusting the levelling by said means for offsetting (34; 100) through the deviation signal, if said measured deviation exceeds a predetermined deviation, in order to keep the deviation within said predetermined deviation. In addition, the present invention also relates to an arrangement for automatic bow adjustment for a venetian blind assembly machine. An advantage over prior art is that the bow adjustment is better controlled, the adjustments can be done with an increasing rapidity and a decreased wastage of strip material is obtained.

24 Claims, 8 Drawing Sheets

METHOD AND ARRANGEMENT FOR AUTOMATIC BOW ADJUSTMENT

CROSS REFERENCE TO RELATED APPLICATIONS

This application is a division of U.S. patent application Ser. No. 09/541,258, filed Apr. 3, 2000, allowed, which corresponds to and claims priority to European Application No. 99201013.2, filed Apr. 2, 1999. Each of the above-identified application is hereby incorporated by reference as though fully disclosed herein.

BACKGROUND OF THE INVENTION

1. Field of Invention

The present invention relates to a method and an arrangement for automatic bow adjustment for a venetian blind assembly machine.

2. Background Art

The production of venetian blinds of different sizes and types in venetian blind assembly machines is previously known in the art. Strip material from which venetian blinds are made is typically supplied in rolls or coils at one end of the machine. The leading end of the strip of material is fed through a levelling station, where offset rollers are positioned to receive the strip material and reversibly bend the material to remove the innate bend that results from storage in a coil condition. Subsequently, the strip material passes through a forming section where mating concave and convex upper and lower form rollers create a transverse curvature in the strip material. Further on in the line of the assembly machine, slats are punched and cut from the strip material, whereafter they are fed to a lacing station, in which the slats are fed into the gaps between the vertical cords of a venetian blind cord ladder.

The object of the levelling station is to remove the innate bend of the strip material that results from storage in a coiled condition and to produce substantially straight longitudinal slats for the blind. The extent of reverse bending of the strip material in the levelling station depends on parameters such as the dimensions for the blind. Different sizes of slat width and even different colours of blinds require different degree of reverse bending. Insufficient bending or over-bending of the strip material will have the result that the slats produced from the strip material have a bow in the longitudinal direction, either provided with an "upbow" curvature or a "downbow" curvature, lying outside acceptable predetermined deviations. According to the prior art production of venetian blinds, the bow adjustments have been done more or less "manually" (that is, not automatically), by trial and error. The basic adjustment, as well as the continuous adjustment during production, of the levelling station has been based on experience. During production, adjustments have been carried out continuously by visually controlling if there is a bow of the slats lying outside the predetermined deviations and thereafter manually adjusting the levelling station for such deviations.

The manual adjustment of the levelling station leads to a large waste of strip material, since produced slats with an unacceptable bow must be rejected and the line must be emptied of strip material. In addition, manually adjusting the process is inefficient and time consuming, as the production must be stopped and restarted during the adjustments. The manual adjustment is especially inefficient when there is a change of dimensions or colours of the slats for production of a new blind in the machine.

Therefore, it is an object of the present invention to overcome or ameliorate at least one of the disadvantages of the prior art and to achieve less wastage of the strip material. A further object is to achieve a venetian blind assembly machine, which operates more efficiently and can be easily controlled to an increasing extent with respect to what is known in the art. Yet a further purpose is to achieve an economically favourable production of venetian blinds and to minimise the drawbacks of prior art processes.

SUMMARY OF THE INVENTION

The above mentioned problem has been solved with the present invention by providing a method for automatic bow adjustment for a venetian blind assembly machine. The bow adjustment station comprises rollers for guiding, bending and levelling a strip material. Further, it comprises a forming section where mating concave and convex upper and lower form rollers are arranged for creating a transverse curvature in the strip material. In addition it includes the steps of: providing levelling through means for offsetting in order to straighten the bow of the strip material within a predetermined deviation on a predetermined length of strip material; measuring the deviation through optical means providing a deviation signal; and adjusting the levelling by said means for offsetting through the deviation signal, if said measured deviation exceeds a predetermined deviation value, in order to keep the deviation within said predetermined deviation value.

An advantage with the method of the present invention is that the bow adjustment is better controlled and the manual bow adjustment can be completely avoided. Thus, the adjustments can be accomplished with an increasing rapidity when there is a change of the dimensions and the colours of the strip material in the production.

A further advantage with the method of the present invention is that a decreased wastage of strip material is obtained. Hence, a much more cost efficient production of venetian blinds can be achieved.

In addition, the present invention also relates to an arrangement for automatic bow adjustment for a venetian blind assembly machine. The bow adjustment station comprises rollers for guiding, bending and levelling a strip material. Further, it comprises a forming section where mating concave and convex upper and lower form rollers are arranged for creating a transverse curvature in the strip material. In addition it includes: means for offsetting strip material, providing levelling in order to straighten the bow of the strip material within a predetermined deviation on a predetermined length of strip material; means for optically measuring the deviation, providing a deviation signal; and means for adjusting the levelling by said means for offsetting through the deviation signal, if said measured deviation exceeds a predetermined deviation value, in order to keep the deviation within said predetermined deviation value.

Embodiments of the present invention are described, without restricting the scope of the present invention thereto with reference to the accompanying drawings, in which:

DESCRIPTION OF THE PREFERRED EMBODIMENTS

Figure 1:
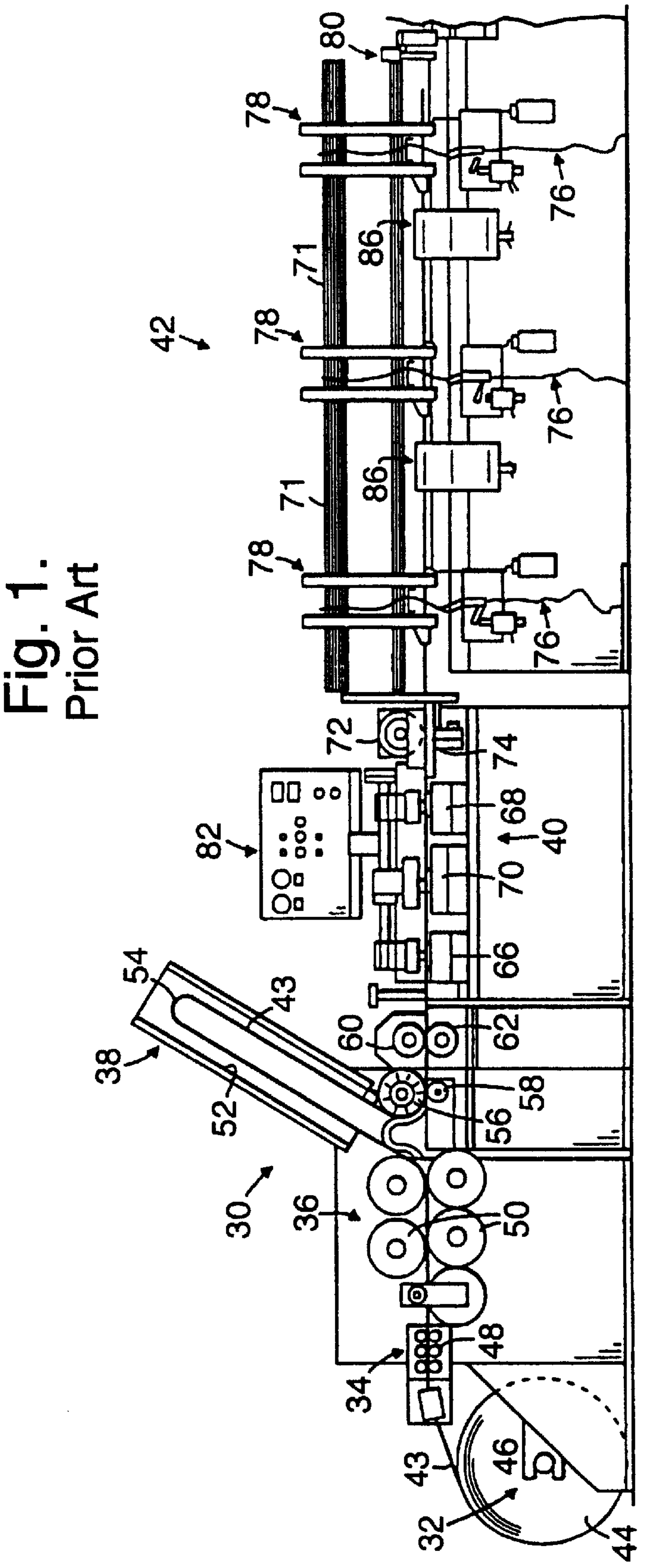
Fig. 1. Prior Art
FIG. 1 is a schematic front elevation illustrating a prior art slat assembly apparatus and showing various processing stations.

An apparatus 30 for assembling venetian blinds is illustrated in FIG. 1. The apparatus includes a supply section 32, means for offsetting in the form of a levelling station 34, a forming section 36, an accumulator station 38, a punch and cut section 40 and a lacing section 42.

Aluminium strip material 43 from which venetian blinds are made is typically supplied in rolls or coils 44, which are stored at the supply section 32 on a rotatable shaft 46. The leading end of the strip of material is fed through the levelling station 34. Offset rollers 48 are positioned to receive the strip material and reversibly bend the material to remove the innate bend that results from storage in a coil condition.

After the levelling station 34, the strip material passes through a forming section 36 where mating concave and convex upper and lower form rollers 50 are positioned to create a transverse curvature in the strip material. An upwardly extending accumulator chamber 52 is provided at the accumulator station 38 so that a length of strip material can be stored in a loop 54. This storage is required to enable subsequent processing steps of the strip material to be intermittent.

From the accumulator station 38, the strip material passes between idler rollers 56 and 58 which may have a surface adapted to remove any irregularities from the surface of the strip material.

After passing through the accumulator station 38 and idler rollers 56 and 58, the strip is driven by drive wheels 60 and 62, one of which can be driven by an electric motor.

The drive wheels 60 and 62 cause the strip material to be fed at predetermined intervals into the punch and cut section 40, where first and second punches 66 and 68 are disposed upstream and downstream from a central cutter 70. The cutter 70 will cut the continuous strip into individual slats 71 of the required length. The punches 66 or 68 are adapted to punch holes (not shown) in the slat material strip for the accommodation of lift cords in the finished blind.

Coming from the cut and punch section 40, the strip material is fed by an outfeed drive roller 72 and outfeed backup roller 74 towards the lacing section 42. Longitudinal movement of the slat material automatically feeds it through a plurality of a downstreamly spaced ladder lacing stations 78. In these ladder lacing stations 78 the slat material is laced into flexible ladder supports 76 which serve to interconnect the individual slats of a blind. Downstream of the last operative lacing station 78 or combined therewith is a stop 80 against which the leading end of each slat abuts.

A computerised control system housed in a control unit 82 may be designed automatically to accept information and process such information depending on parameters such as the required dimensions for the finished blind. It will also be appreciated that different sizes of slat width (generally 25 mm or 16 mm) and different colours of blinds require different ladder supports. Depending on the number of ladder supports the number of lacing stations 78 that will be operative will be variable for each blind under construction. Such information is also accommodated by the computerised control system.

FIGS. 2*a* to 5*d* illustrate the principle construction of a means for offsetting in the form of a levelling station 100 (generally comparable to the levelling station 34 in FIG. 1) and a forming section 102 (generally comparable to the forming section 36 in FIG. 1) in an arrangement for automatic bow adjustment according to the present invention.

Figure 2A:
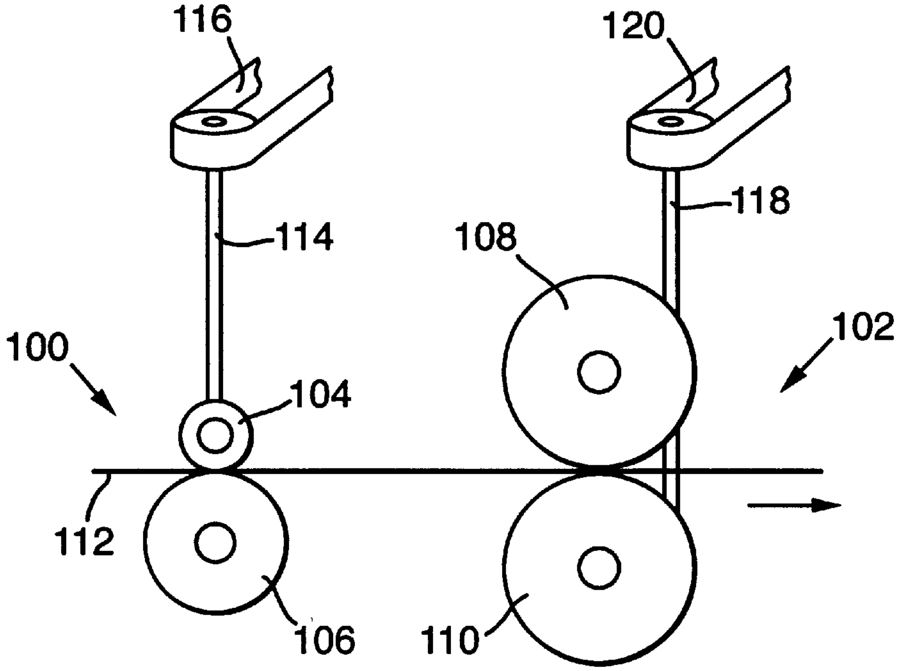
FIG. 2*a* shows a schematic side view of a levelling and forming station in an arrangement for automatic bow adjustment according to the present invention.
Figure 2B:
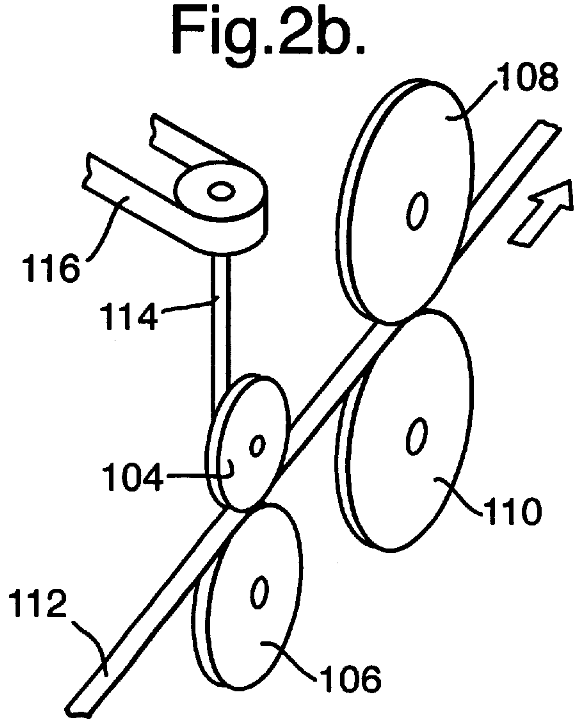
FIG. 2*b* illustrates schematically a partial perspective view of the levelling and forming station of FIG. 2*a;*

As can be seen from FIGS. 2*a* and 2*b,* the levelling station 100 includes at least one upper roller 104 and a confronting lower roller 106, and the forming section 102 comprises generally an upper roller 108 and a confronting lower roller 110. All rollers serve for guiding a strip material 112 (similar to the strip material 43 of FIG. 1) continuously in a forward direction of the production line. However, the levelling station 100 as well as the forming section 102 may of course comprise additional rollers (not shown). The rollers 104, 106 of the levelling station 100 are also adapted to receive the strip material and reversibly bend the material to remove the innate bend that usually results from prolonged storage of the strip in a coiled condition. The object of the rollers 104, 106 is to fine-adjust the levelling of the strip material continuously, suitably without interruption of the production cycle. The positioning of the rollers 104, 106 is preferably adjusted automatically by an electric supply of power (not shown but conventional). The power supply is transmitted through a shaft 114 and a power transmission belt 116 in connection to a screw spindle mechanism or the like (not shown but conventional) for providing the vertical position of the rollers 104, 106. The construction of said mechanism for providing the levelling, can be made in various ways well known to the person skilled in the art. For instance, the rollers 104, 106 can be arranged on a vertically positioned plate, which is pivotally arranged with respect to the axle of roller 108 in the forming section.

Figure 3A:
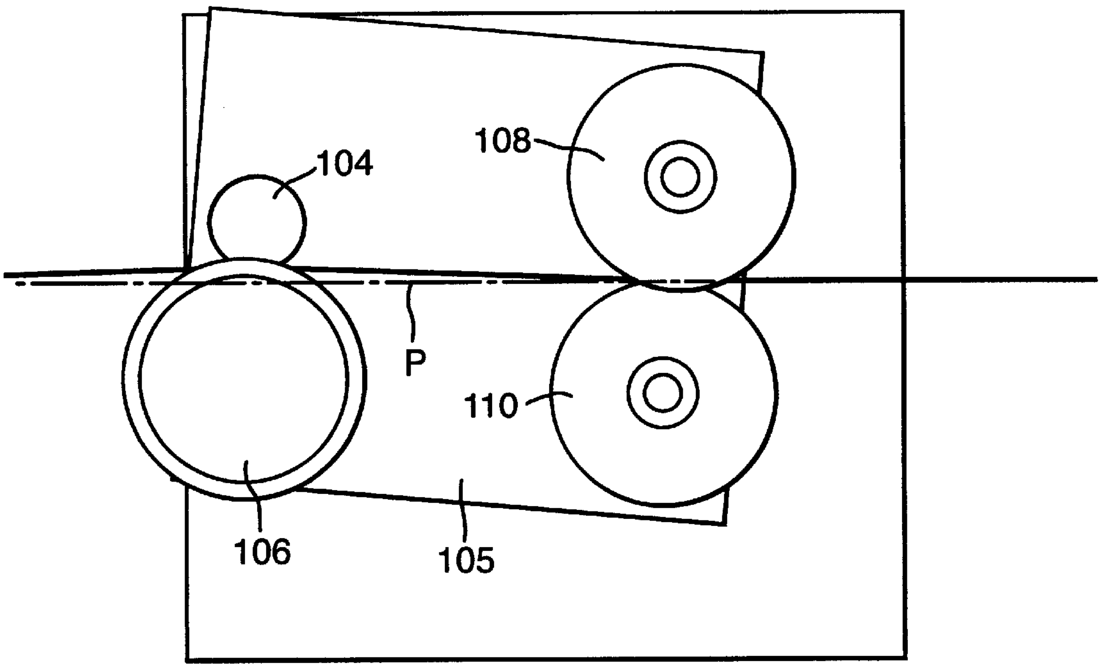
FIGS. 3*a* to 3*d* illustrate a levelling and forming station according to the present invention.
Figure 3B:
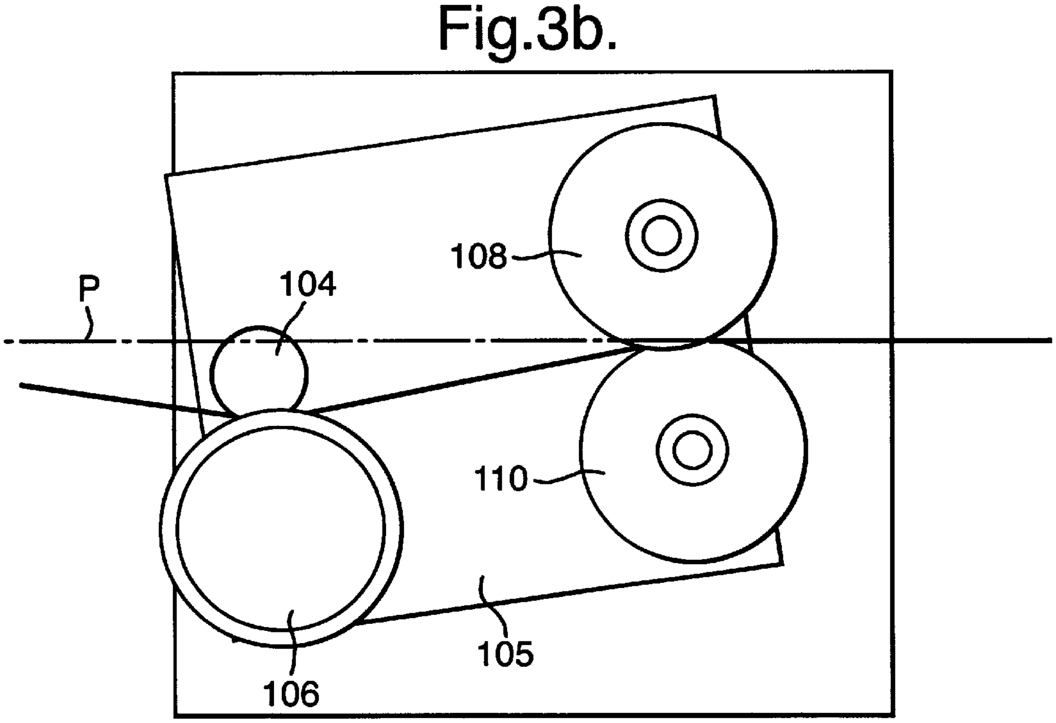
Figure 3C:
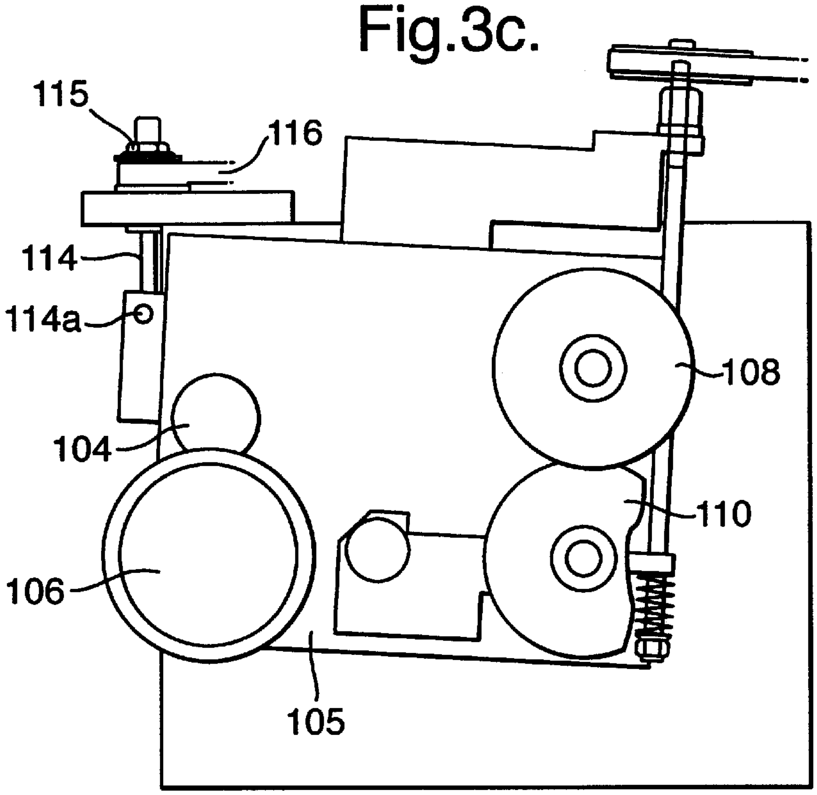
Figure 3D:
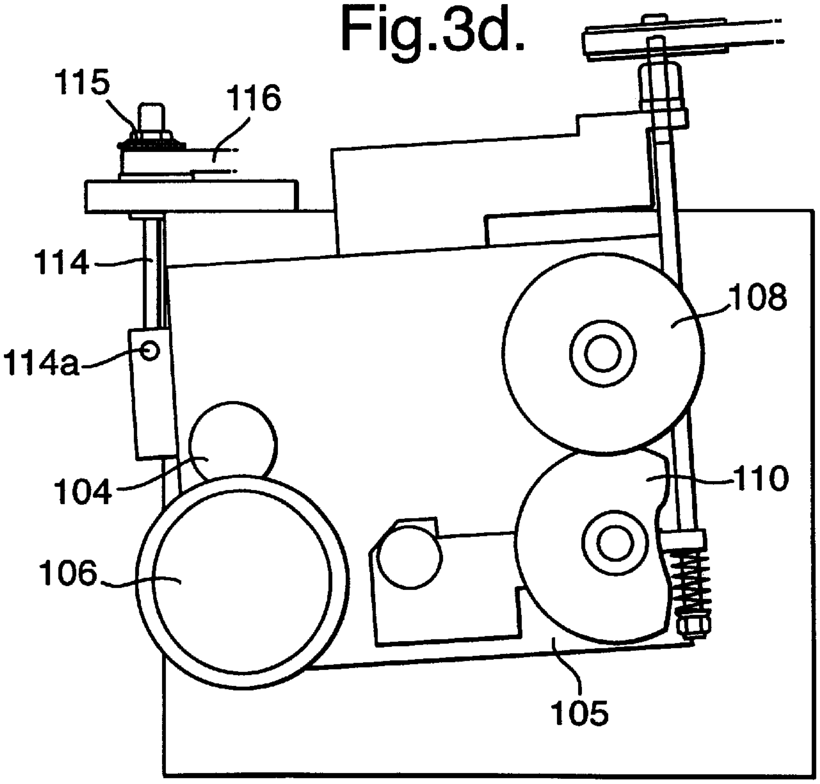

A particular embodiment of the mechanism for providing levelling is illustrated in FIGS. 3*a* to 3*d.* FIGS. 3*a* and 3*b* illustrate schematically rollers 104 and 106 and rollers 108 and 110 arranged on a levelling plate 105. FIGS. 3*c* and 3*d* correspond to FIGS. 3*a* and 3*b* with added detail and roller 110 partially cut away.

Rollers 104 and 106 are mounted rotatably on levelling plate 105 and levelling plate 105 is rotatable about the axis of roller 108.

In the absence of rollers 104 and 106, the strip material would pass in a straight horizontal path through the apparatus as shown by the broken line P. In particular, it would be passed from a previous set of rollers or guides (not illustrated but conventional) to rollers 108 and 110. As illustrated in FIGS. 3*a* and 3*b*, by tilting the levelling plate 105, the rollers 104 and 106 are deflected so as to move the strip material from its otherwise straight path. Thus, by deflecting the strip material around the rollers 104 and 106 in this way, the strip material may be appropriately levelled.

As illustrated in FIGS. 3*c* and 3*d,* the levelling plate 105 is attached to a threaded shaft 114 by means of a pivot 114*a.* The threaded shaft 114 passes through a threaded pulley wheel 115 which is rotatable by means of transmission belt 116. Thus, by operating the transmission belt 116 to rotate the pulley wheel 115, the threaded shaft 114 is caused to move up and down and rotate the levelling plate 105 about the axis of roller 108. In this way, by controlling the transmission belt 116, the levelling operation may be conducted automatically.

Figure 4:
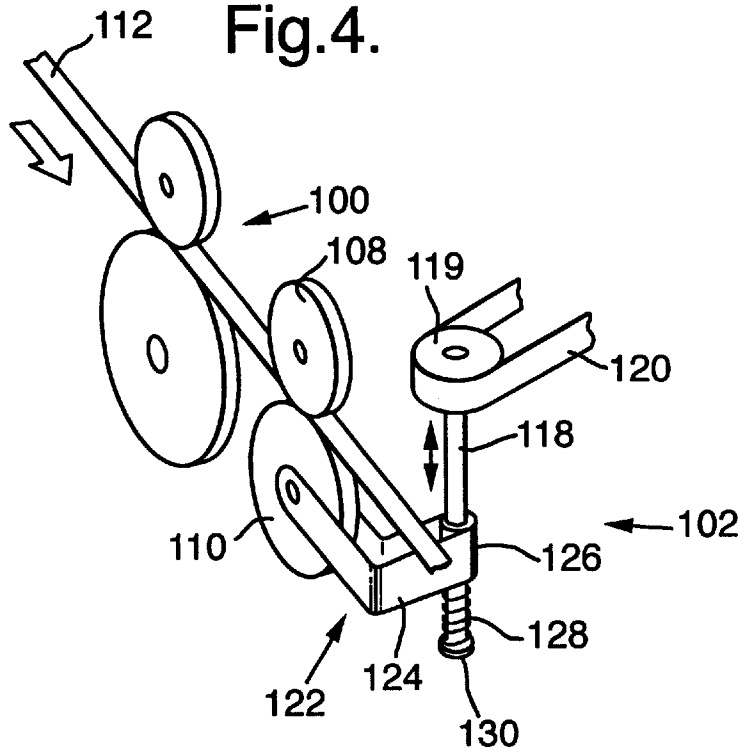
FIG. 4 illustrates schematically another partial perspective view of the levelling and forming station of FIG. 2*a;*

Turning now to FIG. 4, the forming section 102 is schematically illustrated. In the forming section, mating concave and convex upper 108 and lower 110 form rollers are arranged for creating a transverse curvature in the strip material 112. The applied pressure of the rollers 108, 110 is preferably adjusted electrically by an electric supply of power (not shown but conventional). A shaft 118 provided with screw threads is engaged to a supporting structure (not shown but conventional). The shaft 118 is engaged by its thread in a threaded pulley wheel 119 which is rotated by a supply of power via a power transmission belt 120. The shaft is freely rotatably mounted in a member 122, suitably attached to the lower roller 110, for adjusting the applied pressure by the rollers 108, 110. Hence, the shaft 118 is movable in an axial and substantially vertical direction (as indicated by the arrows in FIG. 4). The member 122 can be an arm portion 124 attached at one end to the axle of the lower roller 110. The other end of the arm portion 124 may be in the form of a sleeve part 126 in which the lower part of the shaft 118 is internally arranged and freely axially movable. A spring 128 is arranged on the lower part of the shaft 118, in between the lower end 130 of the shaft and the sleeve part 126 of the arm portion 124. The spring 128 acts on the member 122 as a prestressing force of the lower roller 110. The shaft is arranged to move in an axial direction with rotation of the pulley wheel 119 and is restrained from rotation about its axis. Hence, when the shaft is actuated by supply of power, the lower end 130 is movable up and down, such that the spring is compressed and relaxed and the lower roller 110 provides a increasing or decreasing pressure towards the strip material 112. Moreover, the applied pressure by the rollers 108, 100 also contributes to reversibly bend the strip material 112, in addition to the levelling station 100. Accordingly, during production, the rollers 108, 110 are more or less fixed in a predetermined position with pressure acting on the strip material while the rollers 104, 106 of the levelling station 100 are pivoted up or down for the fine adjustment of the levelling. Hence, by pivoting the levelling station 100, the angle with which the strip material is introduced in the nip between the rollers 108, 110 in the forming section, will vary. Suitably, the coarse adjustment of the pressure and/or levelling towards the strip material is positioned with rollers 108, 110 from the start, while the fine adjustment for the levelling of the strip material is done with rollers 104, 106 of the levelling station.

FIGS. 5*a* to 5*d* illustrate the forming section in greater detail.

Figure 5A:
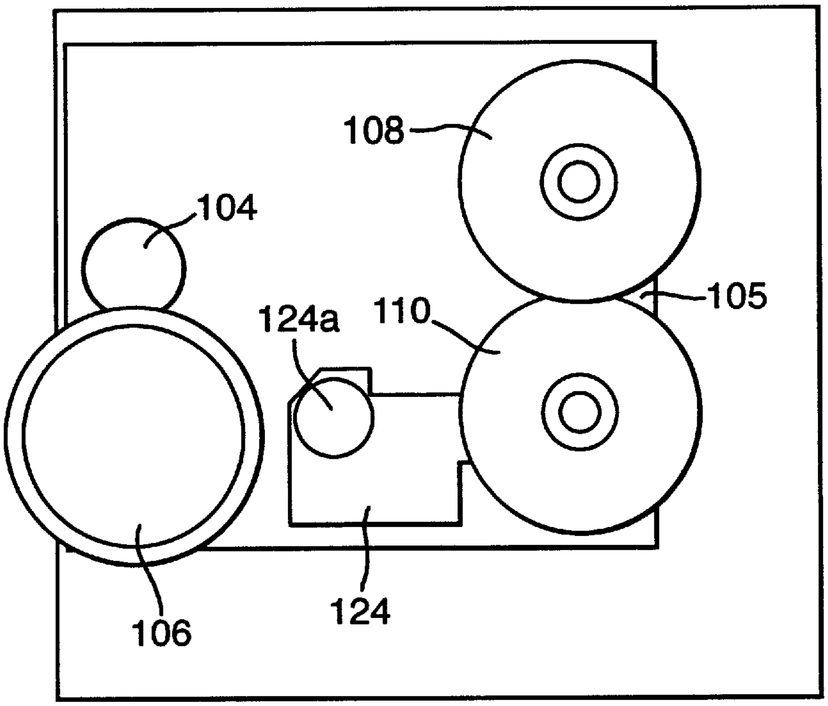
FIGS. 5*a* to 5*d* illustrate a levelling and forming station according to the present invention.
Figure 5B:
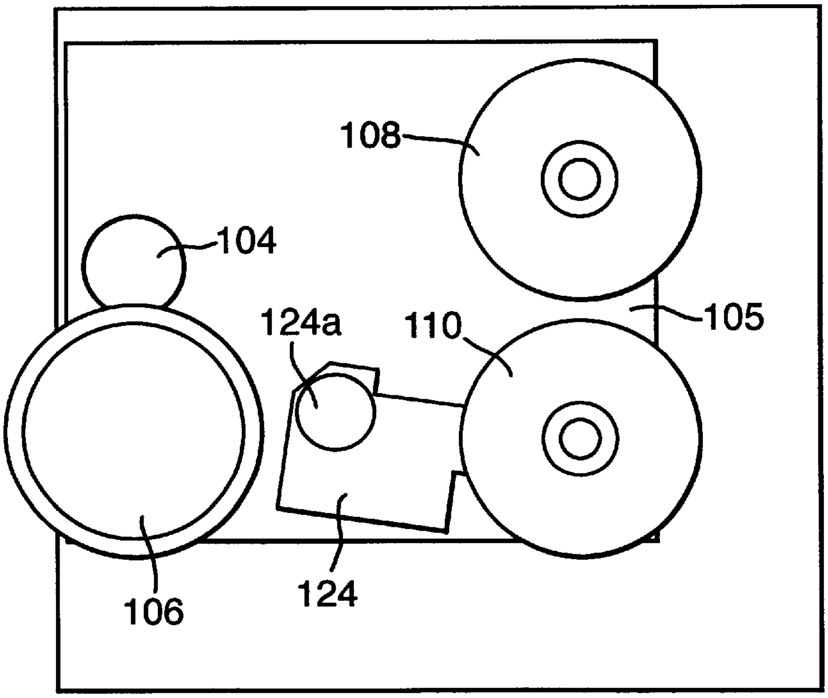

As illustrated in FIGS. 5*a* and 5*b,* lower roller 110 is rotatable on arm portion 124 about a pivot 124*a* on the levelling plate. In this way, as illustrated in FIGS. 5*a* and 5*b,* lower roller 110 may be pivoted towards and away from upper roller 108.

Figure 5C:
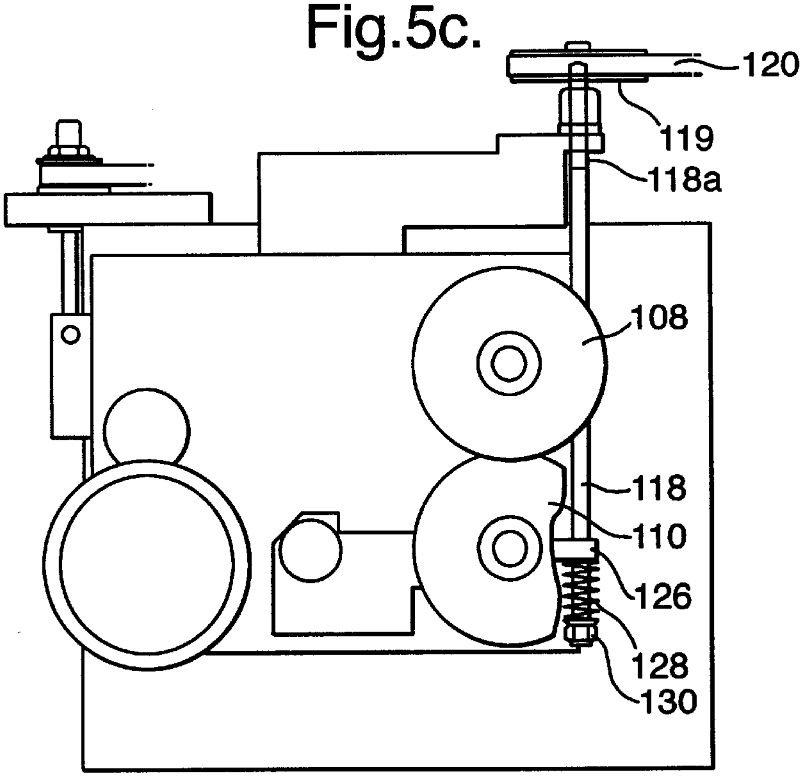
Figure 5D:
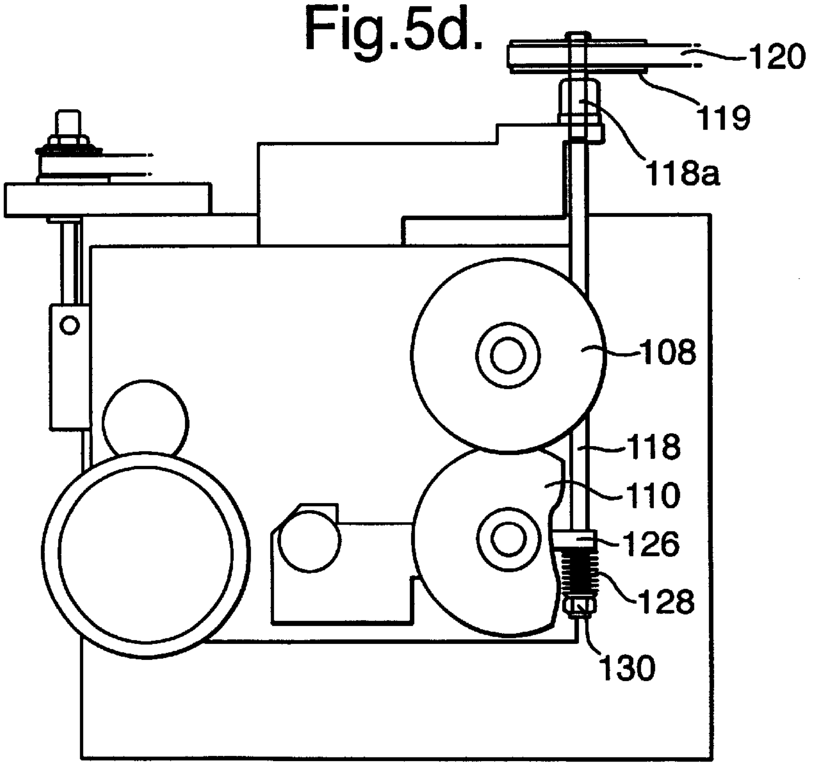

Referring to FIGS. 5*c* and 5*d* (in which the roller 110 is illustrated partially cut away), it will be seen that the arm portion 124 has a sleeve part 126 through which the shaft 118 extends. A spring 128 is positioned around the shaft 118 and is sandwiched between the sleeve part 126 and the lower end 130 of the shaft 118. Thus, by moving the shaft 118 upwardly as illustrated in FIGS. 5*c* and 5*d,* the spring 128 is compressed so as to create additional pressure on sleeve part 126, thereby urging roller 110 to pivot about pivot 124*a* and create additional pressure between the rollers 108 and 110.

Thus, by varying the position of the shaft 118, the pressure between the rollers 108 and 110 can be varied according to the strip material being used.

As illustrated, the shaft 118 has a threaded portion 118*a* at at least one end. In particular, the threaded portion 118*a* engages with a threaded pulley wheel 119 such that rotation of the pulley wheel 119 causes shaft 118 to move up or down as illustrated in FIGS. 5*c* and 5*d.* Furthermore, a transmission belt 120 is provided to drive the pulley 119. Thus, by operating the transmission belt 120, the apparatus is able automatically to adjust the pressure provided between the upper and lower rollers 108 and 110 for forming the strip material appropriately.

Figure 6:
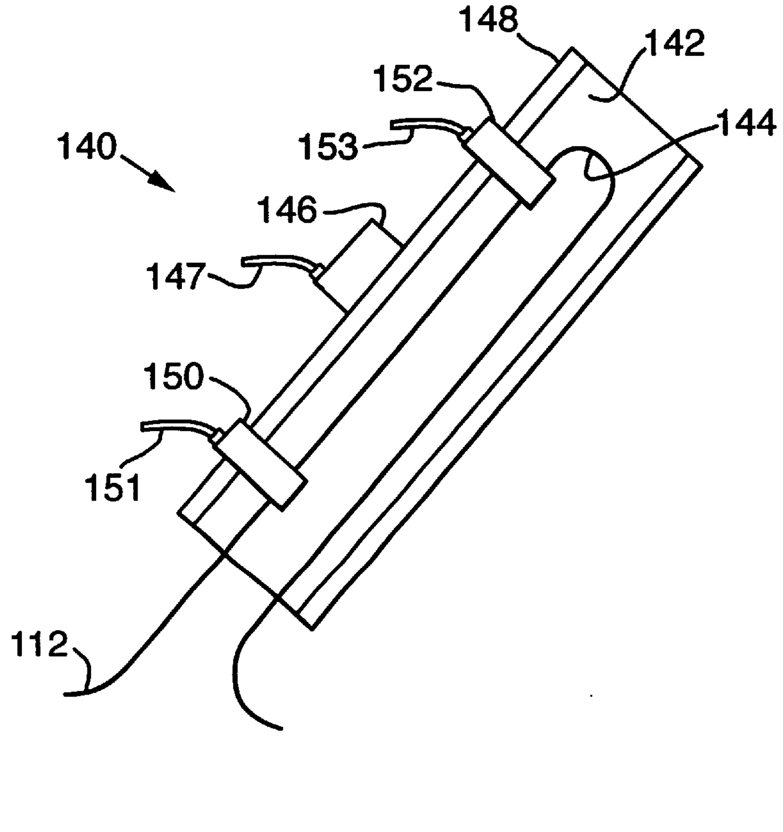
FIG. 6 shows a schematic side view of an accumulator station in the arrangement for automatic bow adjustment according to the present invention.

As illustrated in FIG. 6, in a subsequent stage, after the forming section, an accumulator station 140 (similar to the accumulator station 38 of FIG. 1) is suitably provided for in the arrangement for automatic bow adjustment according to the present invention. An accumulator chamber 142 (similar to the accumulator chamber 52 of FIG. 1), being upwardly extended, is provided at the accumulator station 140 so that a length of strip material 112 can be accumulated in a loop 144. This storage is required to enable subsequent processing steps of the strip material 112 to be intermittent. Optical means 146 is preferably arranged at the wall 148 of the accumulator chamber 142. The optical means is connected to a computerised control system via power and control cable 147. The optical means 146 can be a laser, ultraviolet or infrared operating means, or photoelectric sensors. The optical means is preferably a laser. In addition, there may also be supporting means 150, 152 for guiding and fixing the strip material 112 in the accumulator chamber 142. Consequently, the supporting means 150, 152 can also be in connection with the computerised control system via power and control cables 151, 153. As explained above with reference to FIGS. 2*a* to 3*d,* levelling is provided through means for offsetting at the levelling station 100 in order to straighten the bow of the strip material within a predetermined deviation on a predetermined length of strip material. However, by the use of the optical means 146 at the accumulator station, deviations are continuously measured, during the movement of the strip material, through optical means 146. The optical means 146 provides a deviation signal, which is registered and treated in a computer. The levelling by said means for offsetting 100 is adjusted through the deviation signal, if said measured deviation exceeds a predetermined deviation, in order to keep the deviation within said predetermined deviation. The optical means should preferably be able to measure deviations of, for example, ±0.2 mm along a certain length of the strip material, i.e. within a range between 400 mm and 1200 mm.

During said measuring of the strip material 112, it is essential that the strip material is substantially straight and properly aligned. Preferably, the strip material 112 is in a fixed position during the measurement of the optical means 146. For the purpose of holding the strip material 112 in position for said measuring, supporting means 150, 152 can be attached to the accumulator chamber 142. The supporting means 150, 152 are preferably attached to said accumulator chamber of said accumulator station, each on one of an upstream and downstream side of said means for optical measurement 146. It is suitable to hold the strip material and to make the measurements with the optical means 146 simultaneously when a slat is lifted in the lacing station 78, when a new blind is set-up or during a cut 70 and/or punch 66, 68 operation on the strip material 43, 112 since the forward movement of the strip material 112 then is shortly interrupted anyway.

Figure 7:
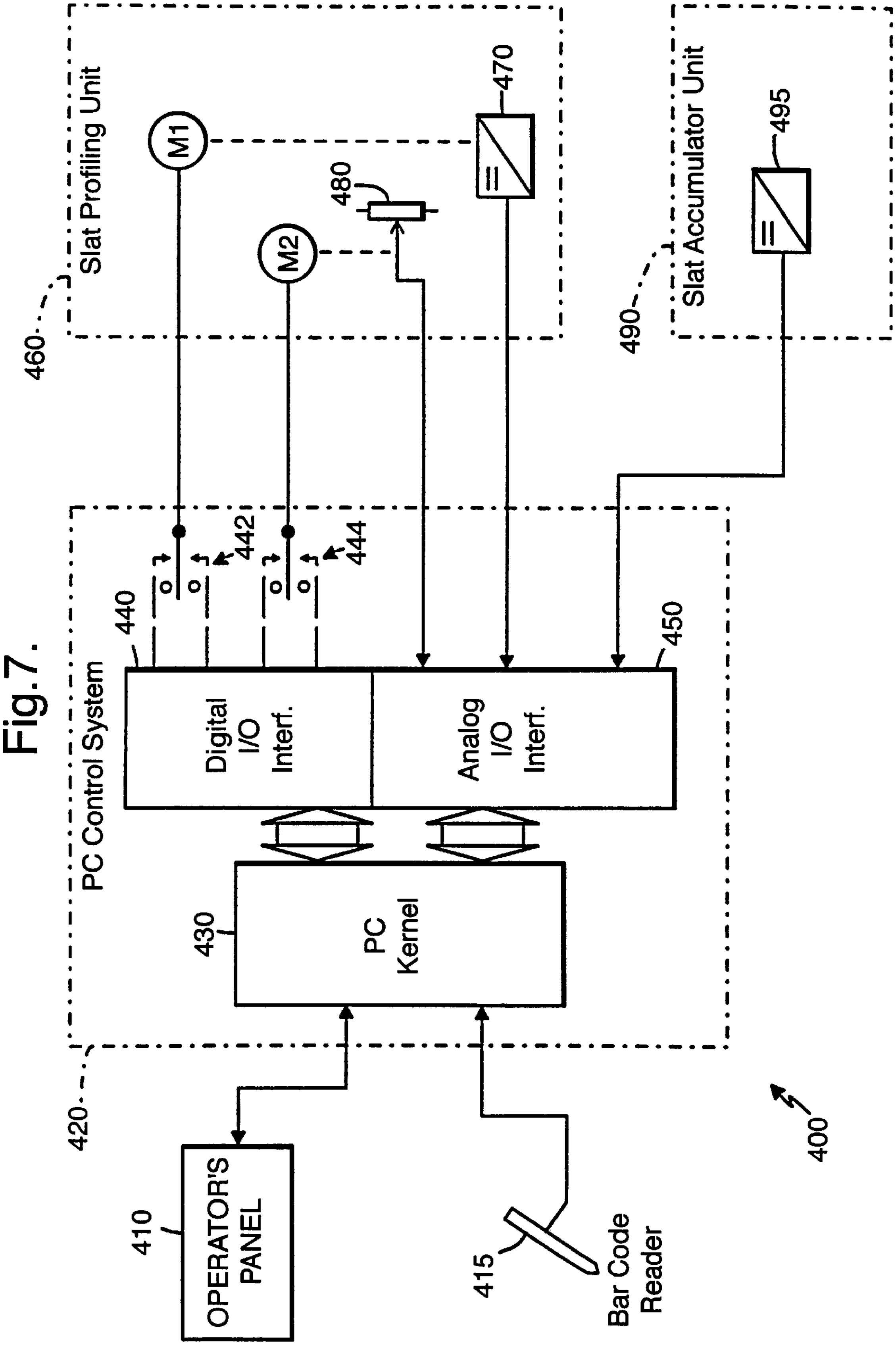
FIG. 7 shows a principal diagram of connections for the automatic bow adjustment according to the present invention.

As illustrated by FIG. 7, a schematic principal block diagram 400 for an embodiment of the automatic bow adjustment according to the present invention is depicted. An operator panel 410 and a bar code reader 415 provides a Man Machine Interface (MMI) for the Venetian blind machine, i.e., means for parameter setting of the machine such as with parameters for the specific strip material 43, 112 in use through means for offsetting 34, 100, 102 in order to straighten the bow of the strip material 43, 112 within a predetermined deviation on a predetermined length of strip material.

A PC control system 420 for the parameter setting is governed by a kernel 430 connected to digital 440 and analogue 450 I/O interfaces, respectively, for control of means 100, 102 regarding i.a. bow adjustment via signals emanating from the means for optical measurement 146.

Switches 442 and 444 are connected to the digital interface 440 for On/Off control of the setting of motor means M1 and M2, respectively, in a slat profiling unit 460. Motors M1 and M2 are preferably of the type stepper, servo or the like motors.

The motor M1 provides a coarse adjustment transmitted via the power transmission belt 120, which is also connected to an axis (not shown) of the motor M1, in a manner known by those skilled in the art. M1 is connected to an input of the I/O interface 450 through a weight indicator 470 providing a position signal, for example inputted as pressure in kilogram, for the coarse adjustment of rollers 110, 108.

The motor M2 is connected to an axis 114 via its axis (not shown), in a manner known by those skilled in the art, via the power transmission belt 116. M2 provides the fine adjustment for levelling in accordance with the present invention through the axis 114 connected to the levelling station 100 in a known manner for those skilled in the art. Means 146 for optical measurement of deviation in bending of the strip material transmits its signals picked up to the PC control system 420 which outputs control signals to the motor M2 in accordance with the measured deviation, thus compensating the bow to be within a predetermined deviation, for example, ±0.2 mm. The device 480, indicated as a field regulator in FIG. 7, inputs a value for deviations to the control system 420, used to make necessary calculations and determinations for regulation via M2 etc.

It is easily understood that deviations within two tenths of a mm are hard, if not impossible, to cope with using methods and arrangements presently known to a person skilled in the art to which the present invention pertains, mainly ocular inspection. But with the optical means for measurement and the method according to the present invention, such deviations are possible to op-hold, with for example a laser measurement device in co-ordination with other measures claimed in the attached set of claims.

The strip accumulator unit 490 comprises a rectifier 495 for input of a trigger signal to the control system 420 for trigging the measurement period of an optical means during for example cutting of the strip material.

Further, by providing the optical means after the levelling station 100 and the forming section 102 at the accumulator station 38, 140 said deviation signal is used as a feedback signal, thus inhibiting time periods for control measurement of said bow and unnecessary loss of strip material compared with possible feed-forward measurements by placing the optical means before station 100 and/or section 102.

It is possible to arrange the optical means, e.g. the preferred laser measurements, before the means for offsetting (and in addition, possibly have means for controlling the deviation after the forming section without using a feedback signal). If the laser measurements are made before the means for offsetting (i.e. even before the levelling station, there will be no feedback signal, but rather feed-forward measurements). However, the most preferred arrangement is still after the forming section as stated in claims 2 and 6.

It is thus believed that the operation and construction of the present invention will be apparent from the foregoing description. The term comprising when used in this description or the appended claims should not be construed in an exclusive or exhaustive sense but rather in an inclusive sense. Features which are not specifically described or claimed may be additionally included in the structure according to the present invention without deviating from its scope. While the method and arrangement illustrated or described has been characterized as being preferred it will be obvious that various changes and modifications may be made therein without departing from the spirit and scope of the invention as defined in the attached claims. It is particularly within the scope of the present invention that any adjusted settings of the bow adjusting means may be electronically saved for future retrieval and re-use.

What is claimed is:

1. An arrangement for automatic bow correction for use in a venetian blind assembly machine, the arrangement including;

a slat profiling unit having an upstream end and a downstream end, the slat profiling unit being adapted to profile slat material fed thereto from the upstream end to remove pre-existing bow in said slat material and create a transverse curvature into the slat material exiting the slat profiling unit from its downstream end, the slat profiling unit comprising a leveling section downstream of its upstream end and a forming section downstream of the leveling section, the forming section providing a coarse adjustment for removing bow and the leveling section providing fine adjustment for removing bow;

a control system for controlling the removal of said bow by automatically adjusting said leveling and forming sections of said slat profiling unit; and an accumulator station having therein means for optical measurement of bow in said slat material downstream from said leveling and forming sections and for providing a signal to the control system to govern the automatic adjustment of said leveling and forming sections.

2. The arrangement of claim 1, further comprising an external man machine interface for setting predefined parameters of the control system.

3. The arrangement of claim 2, wherein the external man machine interface comprises an operator panel.

4. The arrangement of claim 3, wherein the operator panel comprises means for displaying parameter values.

5. The arrangement of claim 2, 3, or 4, wherein the external man machine interface comprises a bar code reader for entering parameter settings into the control system.

6. The arrangement of claim 1, wherein the control system comprises at least one internal interface.

7. The arrangement of claim 6, wherein the at least one internal interface comprises a digital input and output interface.

8. The arrangement of claim 7, wherein the digital interface is adapted to issue a control signal forte adjustment of the profiling unit.

9. The arrangement of claim 6, wherein the at least one internal interface comprises an analog input and output interface.

10. The arrangement of claim 9, wherein the analog interface accepts at least one feed back signal from any one of the slat profiling unit and the means for optical measurement.

11. The arrangement of claim 1, wherein the forming section comprises mating upper and lower form rollers for creating the transverse curvature in the slat material passing therebetween and wherein the upper and lower rollers are adapted to apply pressure on the slat material passing therebetween, which pressure is presentable for coarse adjustment of the correction of bow.

12. The arrangement of claim 11, wherein the adjustment of the applied pressure for the coarse adjustment is effected by means of a first electric servo motor.

13. The arrangement of claim 12, wherein the first electric servo motor adjusts the applied pressure by rotating a downstream shaft through a downstream transmission belt to increase or decrease pressure on the lower roller by prestressing a spring acting on the lower roller.

14. The arrangement of claim 12 or 13, wherein the pressure applied by the form rollers produces a feed back signal through the first servo motor to the control system.

15. The arrangement of claim 1, wherein the leveling section comprises upper and lower leveling rollers defining a nip forte passage of slat material therebetween and wherein the nip is vertically positionable for fine adjustment of the correction of bow.

16. The arrangement of claim 15, wherein the vertical position of the nip for the fine adjustment is set by means of a second electric servo motor.

17. The arrangement of claim 16, wherein the second electric servo motor sets the vertical position of the nip by rotating an upstream shaft through an upstream transmission belt.

18. The arrangement of claim 15, 16 or 17, wherein the leveling rollers are arranged on a pivotally mounted plate.

19. The arrangement of claim 15 or 16, wherein the fine adjustment takes into account a predetermined boundary value for bow allowance, to straighten the bow of the slat material within a predetermined deviation on a predetermined length of slat material.

20. The arrangement of claim 1, wherein the means for optical measurement comprises a laser sensor.

21. The arrangement of claim 1 or 20, wherein the means for optical measurement is positioned intermediate an upstream supporting means and a downstream supporting means for guiding, aligning and positioning the slat material in respect of the means or optical measurement.

22. The arrangement of claim 1 or 20, wherein the means for optical measurement provides a signal for the control system for use in adjustment of the leveling section.

23. The arrangement of claim 1 or 20, wherein the means for optical measurement is adapted to detect deviations within ±0.2 mm over a length of slat material of at least 400 mm, but not exceeding 1200 mm.

24. The arrangement of claim 1, wherein the means for optical measurement is adapted to be positioned in a slat accumulator unit of a venetian blind assembly machine.

* * * * *

UNITED STATES PATENT AND TRADEMARK OFFICE

CERTIFICATE OF CORRECTION

PATENT NO. : 6,637,086 B2 
DATED : October 28, 2003
INVENTOR(S) : Peter Ingemar Berntsson et al.

It is certified that error appears in the above-identified patent and that said Letters Patent is hereby corrected as shown below:

Title page,
Item [75], Inventors, after "Jonas Leo Larsson," delete "Gothenburg" and insert -- Goteborg --;

Column 8,
Line 63, delete "forte" and insert -- for the --; and

Column9,
Line 25, delete "forte" and insert -- for the --.

Signed and Sealed this

Sixteenth Day of March, 2004

JON W. DUDAS
*Acting Director of the United States Patent and Trademark Office*